United States Patent [19]

Muirhead et al.

[11] Patent Number: 5,359,920
[45] Date of Patent: Nov. 1, 1994

[54] MUNITION IMPACT POINT INDICATOR AND AUTOMATIC GUN AIMPOINT CORRECTION SYSTEM

[75] Inventors: James O. Muirhead, San Pedro; Ronald A. Steen, Huntington Beach, both of Calif.

[73] Assignee: Hughes Aircraft Company, Los Angeles, Calif.

[21] Appl. No.: 991,848

[22] Filed: Dec. 15, 1992

[51] Int. Cl.$^5$ .............................................. F41G 3/22
[52] U.S. Cl. ................................ 89/41.07; 89/41.21; 364/423; 342/465
[58] Field of Search .................... 89/41.07, 41.21; 102/513; 364/923, 922.5; 455/98; 342/465

[56] References Cited

U.S. PATENT DOCUMENTS

| | | | |
|---|---|---|---|
| 2,409,462 | 10/1946 | Zworgkin et al. | 89/41.07 |
| 2,557,949 | 6/1951 | Deloraine | 89/41.07 |
| 2,855,592 | 10/1958 | Busignies | 89/41.07 |
| 4,315,609 | 2/1982 | McClean et al. | 244/3.14 |
| 5,125,104 | 6/1992 | Ohkawa | 455/98 |
| 5,263,012 | 11/1993 | Muirhead | 368/119 |

FOREIGN PATENT DOCUMENTS 116183 8/1984 European Pat. Off. ........... 89/41.07

*Primary Examiner*—Stephen C. Bentley
*Attorney, Agent, or Firm*—W. K. Denson-Low

[57] ABSTRACT

RF energy radiated by impacting munition rounds is used to provide an indication to a gunner where the rounds from his gun are striking, or to control a gun servo (158) to automatically correct the aiming of the gun. The RF energy from the rounds is received by several antennas (32, 34, 36) in a known geometry and the angle of arrival computed from the differences in the times of arrival at each antenna. The impact locations can be displayed in the existing gun sight, or in a head up display for the gunner. The angle of arrival information can further be used to control a gun aiming servo (158) to correct the aim of the gun to improve accuracy.

12 Claims, 5 Drawing Sheets

MUNITION IMPACT POINT INDICATOR AND AUTOMATIC GUN AIMPOINT CORRECTION SYSTEM

BACKGROUND OF THE INVENTION

This invention relates to improvements in gunnery systems.

The trajectory of gunfire is subject to many aerodynamic forces which make accurate gunnery from moving platforms such as helicopters very difficult. Presently, machine guns use tracer ammunition to indicate the trajectory of rounds fired. The tracers burn out after about 900 meters of flight and have the unfortunate effect of revealing the location of the gun firing them. Also, in many cases a gunner cannot see the impacts of the rounds because of darkness, wet weather or foliage.

This invention will provide the gunner with a graphic display of the location of the impact of his fire with respect to the aim point. This will allow the gunner to correct his aim and achieve a significant increase in the accuracy of fire. The invention further provides for the automatic correction of the gun aiming.

SUMMARY OF THE INVENTION

In accordance with this invention, RF energy is radiated by impacting munition rounds to indicate to a gunner where the rounds from his gun are striking. The RF energy from the rounds is received by several antennas in a known geometry and the angle of arrival computed from the differences in the times of arrival at each antenna. The angle of arrival information can further be used to control a gun aiming servo to correct the aim of the gun to improve accuracy.

This invention will replace tracer ammunition in many applications. The munition round impacts are displayed in the existing gun sights or in a new head-up display for machine guns which can be installed in helicopters, for example. Gunnery in accordance with this invention does not give away the location of the gun because the RF energy is only emitted upon impact of the projectile.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

This invention employs ammunition whose projectiles are equipped with tiny RF transmitters powered by piezoelectric material which uses either the chamber pressure of the gun or the kinetic energy of the projectile at impact to supply electricity to the transmitter oscillator. On impact the bullet radiates a strong, brief (1 to 5 microseconds) burst of RF energy whose wavelength is proportional to the bullet diameter. Such ammunition is described in pending application Ser. No. 07/798,480, filed Nov. 26, 1991, entitled "Radio Frequency Device for Marking Munition Impact Point," J. O. Muirhead and G. E. Held, commonly assigned with the present application. The entire contents of this application are incorporated herein by this reference.

Figure 1:
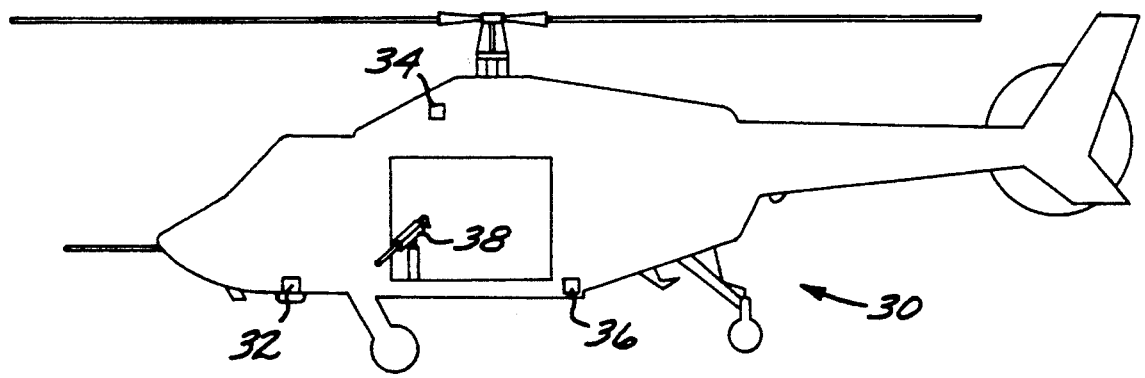
FIG. 1 illustrates a helicopter with a side mounted gun and an antenna system in accordance with this invention.
Figure 2:
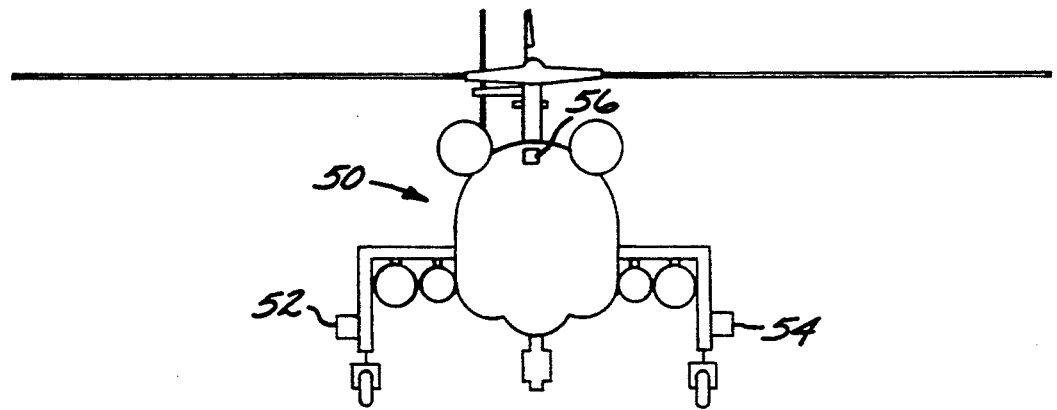
FIG. 2 illustrates a helicopter with a forward firing gun and an antenna system in accordance with this invention.

A munitions impact indicator system in accordance with this invention comprises three or more antennas mounted, in the exemplary case of a helicopter, as shown in FIGS. 1 or 2. FIG. 1 shows a helicopter 30 with front and rear antennas 32, 36 mounted on the side of the fuselage adjacent a side door, and top antenna 34 mounted above the door. A gun 38 is mounted for firing out the side door of the helicopter 30.

FIG. 2 illustrates an antenna arrangement useful for a helicopter 50 employing forward firing guns. In this case, the antennas 52 and 54 are mounted on the starboard and port sides, and top antenna 56 is mounted near the top of the helicopter.

Figure 3:
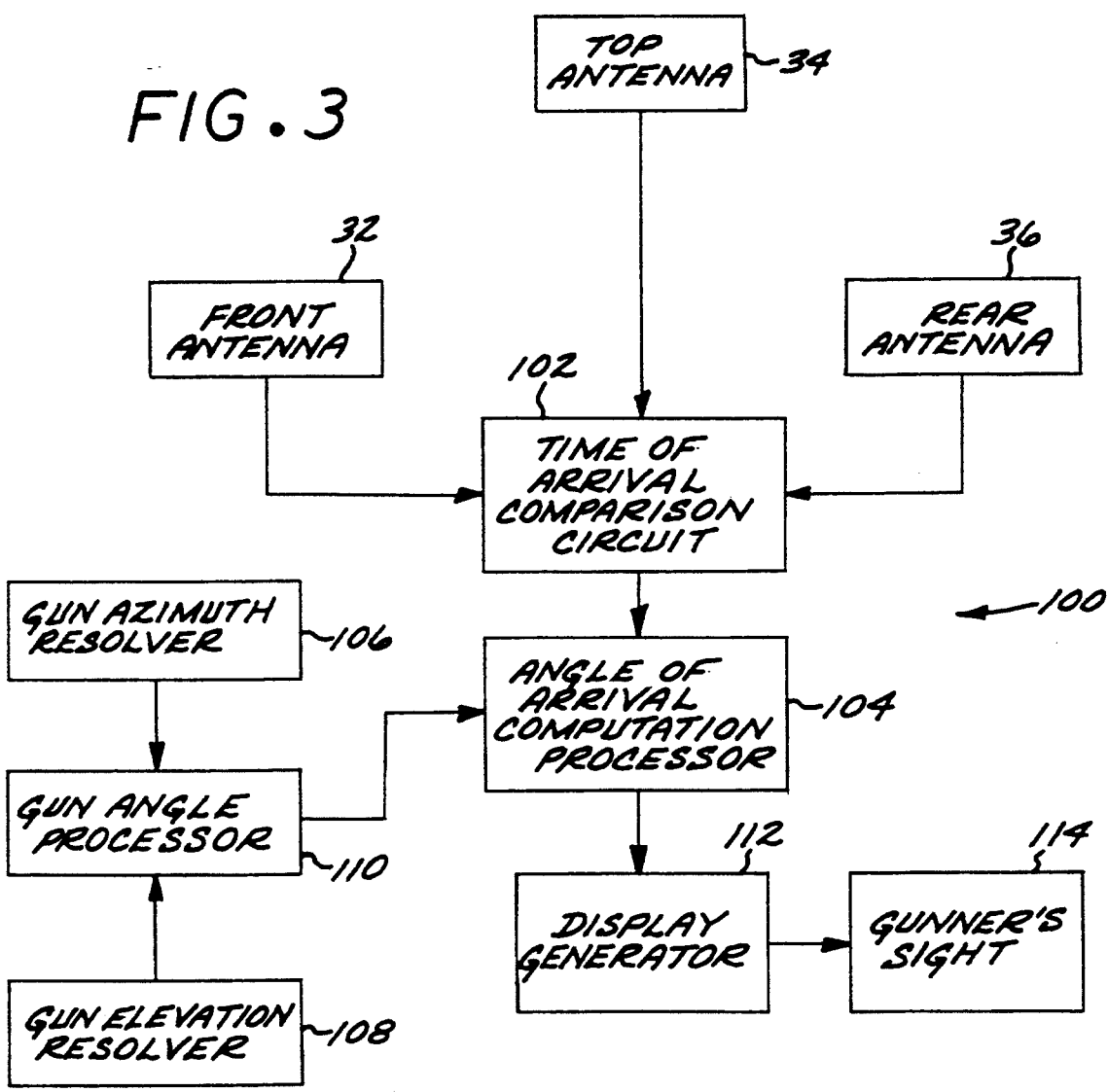
FIG. 3 is a schematic block diagram of a munition impact point indicator system embodying this invention.

The system receives the RF energy and determines the difference in the time of arrival between the three antennas. FIG. 3 illustrates a block diagram of a system 100 embodying the invention to provide a display of the location of impact of the munition rounds on the gunner's sight. This exemplary embodiment is for the side mounted gun 38 of FIG. 1. The signals received by the front, top and rear antennas 32, 34 and 36 are coupled to a time of arrival comparison circuit 102. This circuit 102 very precisely measures the time of arrival of the signal generated by the impacting munition at each of the three antennas 32, 34 and 36. The circuit 102 may, for example, be the circuit described in pending application Ser. No. 07/818,314, filed Jan. 8, 1992, entitled "Sub-Nanosecond Time Difference Measurement," by J. O. Muirhead, now U.S. Pat. No. 5,263,012, commonly assigned with the present application. The entire contents of this pending application are incorporated herein by this reference.

The respective times of arrival of the signal at the respective antennas 32, 34 and 36 are fed to the angle of arrival computation processor 104, together with data representing the gun angle referenced to the aircraft. This data is provided by a gun angle processor 110 which in turn receives data from the gun azimuth and elevation resolvers 106 and 108. The azimuth resolver 106 is mounted in the horizontal position to measure the azimuth gun angle, and the elevation resolver 108 is mounted in the vertical position to measure the elevation gun angle. The processor 110 converts the azimuth and elevation angles into the gun angle referenced to the aircraft, and the gun angle data is fed to the processor 104.

Figure 4:
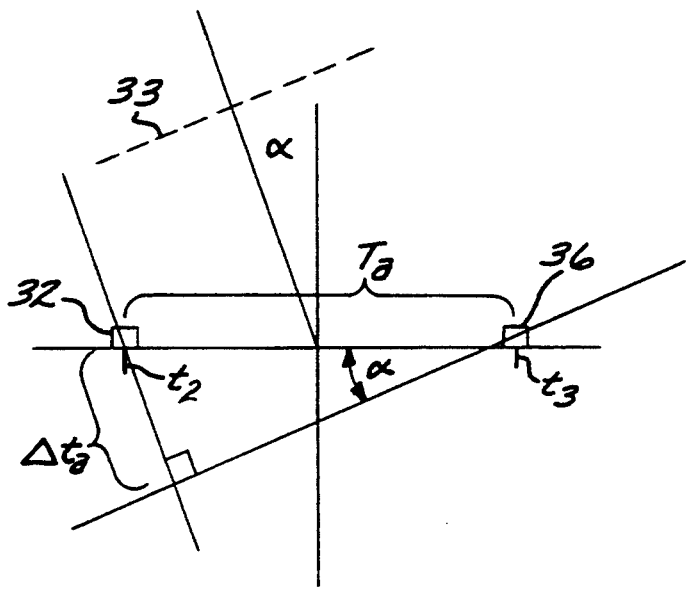
FIGS. 4 and 5 illustrate the measurement by which the angle of arrival of the RF signal in azimuth and elevation may be made.
Figure 5:
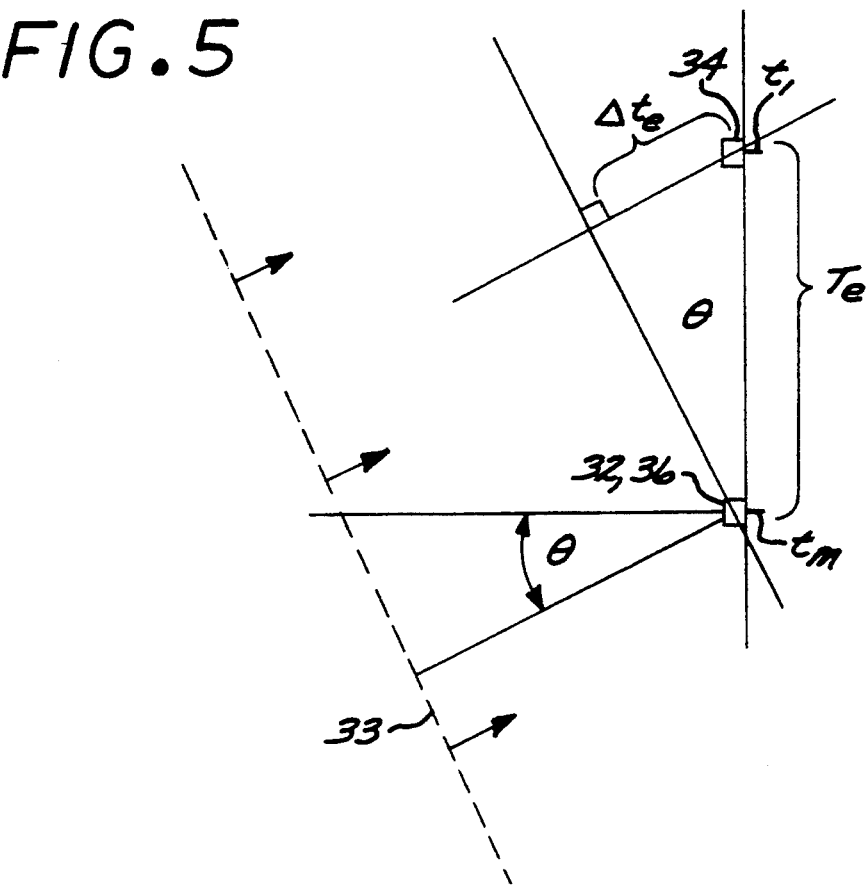

Because the location of each of the antennas is known, the angle of arrival of the RF signal at the antenna system comprising antennas 32, 34 and 36 can be accurately determined by trigonometry. An exemplary method for computation of the RF signal angle of arrival is indicated in FIGS. 4 and 5. The locus of constant time difference of arrival between two receive antennas defines a hyperbola. When the distance from the antenna to the projectile impact point is much greater than the distance between the antennas, the hyperbolic line becomes asymptotic to the angle of arrival of the RF energy. In other words, when the source of RF energy is a large distance away, the wave front is essentially flat over the space between the antennas 32, 34, 36.

The angle of arrival of the RF signal to the antenna array will be determined by accurately measuring the time of arrival of the RF signal to each antenna element. The two lower antennas 32 and 36 determine the azimuth angle to the RF source, and the elevation angle determined by the mean of the lower two element time of arrival measurements and the top element time of arrival.

As shown in FIG. 4, the wave front 33 is incident on the front and rear antennas 32 and 36 at an angle $\alpha$. The time of arrival of the wave front at antenna 32 is measured as $t_2$, and the time of arrival at antenna 36 is measured as $t_3$. The time distance between the two antennas (measured by the time needed for an RF signal to traverse a distance equal to the separation distance of the two antennas 32 and 36) is $T_\alpha$. The angle $\alpha$ is equal to $\sin^{-1} \Delta t_\alpha / T_\alpha$, where $\Delta t_\alpha = t_2 - t_3$. The mean of the time of arrival of the RF signal at antennas 32 and 36, $t_m$, is equal to $(t_2 - t_3)/2$.

FIG. 5 shows the manner in which the elevation time of arrival can be measured. The mean time of arrival $t_m$ is used as the time of arrival of the signal at the lower antennas 32, 34. The time of arrival of the wavefront 33 at the top antenna 34 is $t_1$. Therefore, $\Delta t_e = t_m - t_1$, and the elevation angle of arrival is given by $\sin^{-1} \Delta t_e / T_e$, where $T_e$ represents the time distance between the top antenna 34 and a line connecting the lower antennas 32 and 36, i.e., the time needed for an RF signal to traverse the distance between top antenna and the lower antenna line.

The direction in which the gun is pointed is determined by the weapons sight for forward firing guns and by instrumentation on the gun mount in the case of helicopter door guns or side firing guns mounted in fixed wing aircraft.

Figure 6:
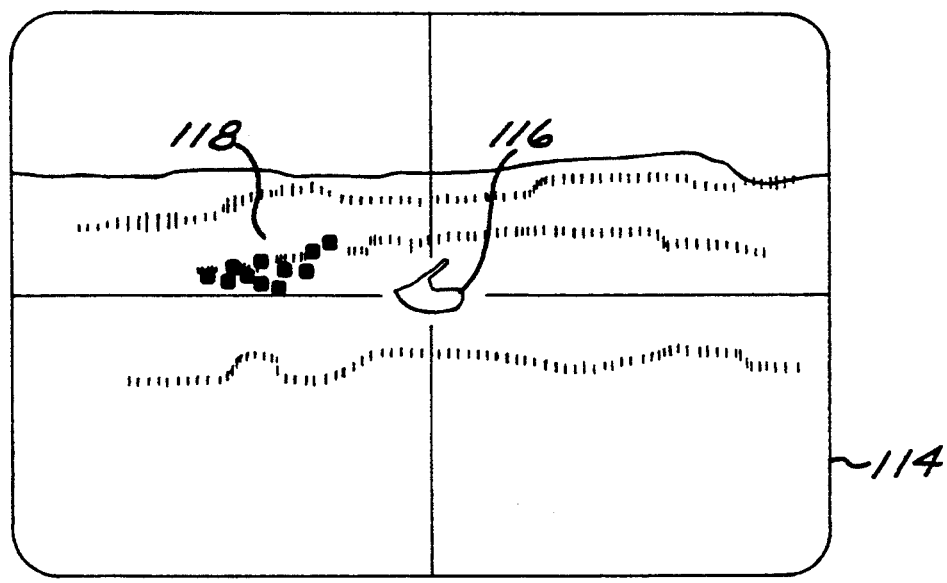
FIG. 6 illustrates an exemplary display on a gunner's sight of munition round impact symbology generated by the system of FIG. 3.

The display generator 112 comprising system 100 compares the vertical and horizontal angles of arrival of the RF signals with the gun aim point for each RF burst received and puts a brief display of the impact point at the proper angular position in the gun sight 114 to indicate the location of impact as illustrated in FIG. 6. Here, the gunner's aimpoint is indicated by 116, and the relative munition impact points are indicated by reference 118.

The conventional weapon system sight for forward firing guns may be used with display generator 112 to display the impact point. Door guns typically have fixed "iron sights" requiring an appropriate display type of sight upon which to put the munitions impact symbology; one example of a suitable type of display is a head-up display.

Figure 7:
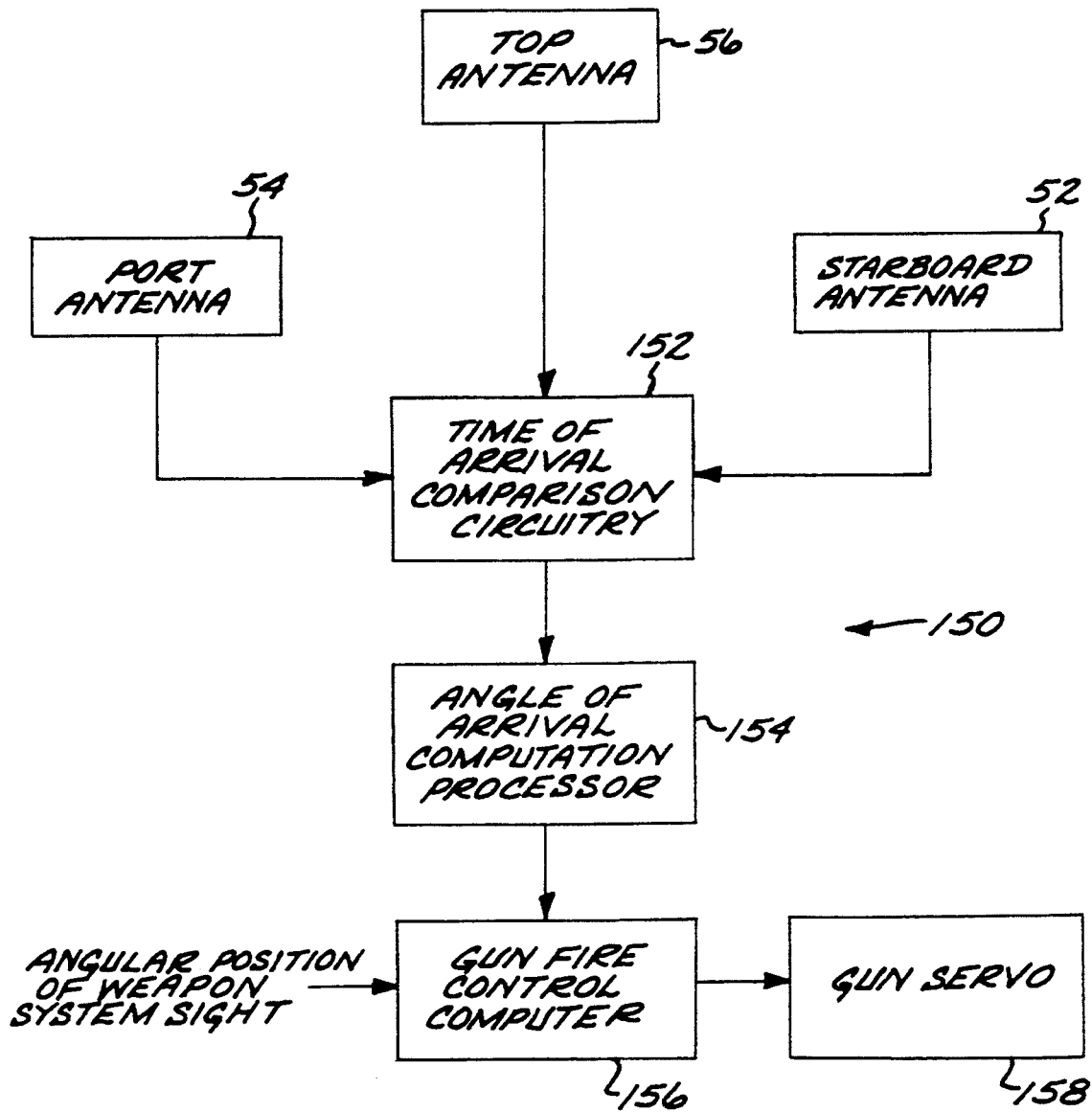
FIG. 7 is a schematic block diagram of an automatic gun aimpoint correction system in accordance with this invention.
Figure 8:
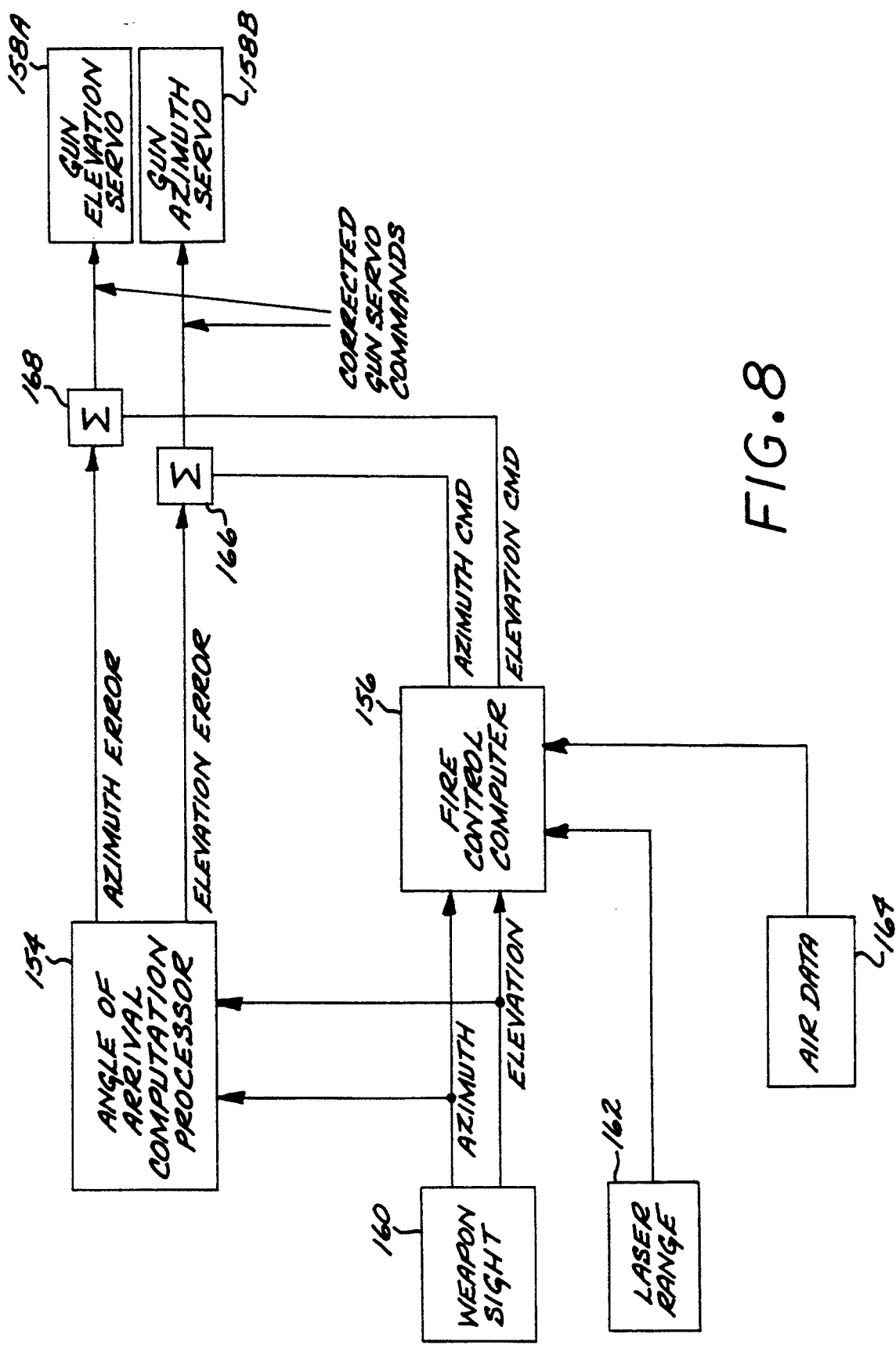
FIG. 8 is a further block diagram of the servo control loop of the system of FIG. 7.

FIG. 7 illustrates a further aspect of the invention, wherein a gun servo pointing system acts in response to the received RF signals from impacting munitions to correct the aiming of the gun to improve accuracy of gunnery. This exemplary embodiment is for the helicopter 50 of FIG. 2. The signals received by the port 54, starboard 52 and top 56 antennas are fed to a time of arrival comparison circuit 152, which performs the same functions as described for circuit 102 of FIG. 3. The respective times of arrival of the RF signals at the antennas are then fed to angle of arrival computation processor 154 which computes the angle of arrival of the RF signals, and passes the computed value to the gun fire control computer 156. The computer 156 also receives data indicating the angular position of the weapon system sight, i.e., data indicating the angular position of the weapon sight, reflecting the azimuth and elevation angle of the bore sight of the weapon, referenced to the aircraft platform. This information is used with the angle of arrival of the RF signals to issue correcting signals to the gun servo 158 to correct the gun aiming so that the subsequent rounds impact the desired impact location. FIG. 8 shows the servo control loop for system 150. Data representing the azimuth and elevation angle of the weapon sight 160 relative to the aircraft is fed (by azimuth and elevation resolvers, not shown) to the fire control computer 156. Target range data is also provided to the computer 156 by a laser rangefinder 162. An air speed sensor provided data representing the aircraft air speed to the computer 156. The fire control computer 156 processes this data in the conventional manner to generate azimuth and elevation servo commands fed to respective summing nodes 166 and 168.

In accordance with the invention, the weapon sight azimuth and elevation angle data are fed to the angle of arrival computation processor 154. The sight angle data is compared to the angles of arrival of the RF signal from the impacting rounds to calculate azimuth and elevation error signals. These error signals are fed to nodes 168 and 166, respectively, where they are respectively combined with the azimuth and elevation commands from the fire control computer 156 to produce corrected azimuth and elevation gun servo commands. The corrected commands control respectively the gun elevation and azimuth servos 158A and 158B which mechanically point the gun boresight in accordance with the corrected gun servo commands.

Thus, for the invention of FIGS. 5–8, the gunner need only to place his sight on the target and fire. The system will correct the gun aiming without further gunner action.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A munition impact point indicator system for a gun, comprising:
    a munition projectile fired by said gun which upon impact radiates a burst of RF energy;
    at least three antennas for receiving RF energy emitted by said projectile upon impact, said antennas mounted on a mobile platform and separated from each other to form an antenna triangulation network carried by said platform, and wherein the distances from the point of impact of said projectile to said antennas is much greater than the separation distances between said antennas;

time of arrival comparison circuit means for measuring the relative time of arrival of said RF energy emitted by said projectile at each said antenna;

processing means responsive to said respective relative times of arrival to compute the angle of arrival of said RF energy in relation to said gun; and means for providing an indication to the gun operator of the projectile impact location.

2. The system of claim 1 wherein said mobile platform is an aircraft, said gun is mounted on said aircraft, said antennas are mounted at spaced locations on said aircraft, and said system further comprises means for providing an indication of the gun pointing angle referenced to said aircraft.

3. The system of claim 2 wherein said aircraft is a helicopter, said gun is mounted for forward firing, and said antennas are located at port and starboard sides of said helicopter, and adjacent the top of the fuselage of the helicopter.

4. The system of claim 1 wherein said means for providing an indication comprises a gun sight display for displaying an indication of the gun aiming point and said impact location in relation to said gun aiming point.

5. The system of claim 1 wherein said processing means comprises means for directly computing said angle of arrival using a $\sin^{-1}$ function of a ratio of a difference in said relative times of arrival at respective antennas to a known propagation time for an RF signal to propagate between said antennas.

6. A munition impact point indicator system for a side-firing gun mounted in an aircraft, comprising:

a munition projectile fired by said gun from one side of said aircraft and which upon impact radiates a burst of RF energy;

at least three antennas for receiving RF energy emitted by said projectile upon impact, said antennas mounted at spaced locations on said aircraft adjacent to the front, rear and top of said aircraft and separated from each other to form an antenna triangulation network;

time of arrival comparison circuit means for measuring the relative time of arrival of said RF energy emitted by said projectile at each said antenna;

processing means responsive to said respective relative times of arrival to compute the angle of arrival of said RF energy in relations to said gun;

means for providing an indication to the gun operator of the projectile impact location; and means for providing an indication of the gun pointing angle referenced to said aircraft.

7. The system of claim 6 wherein said aircraft is a helicopter, said gun is mounted for firing from a side door located in the fuselage of said helicopter, and said antennas are located at the front, rear and top of said fuselage.

8. The system of claim 6 wherein said gun is a side-firing gun for firing said projectile from one side of said aircraft, and said antennas are located adjacent from the front, rear and top of said aircraft.

9. The system of claim 8 wherein said aircraft is a helicopter, said gun is mounted for firing from a side door located in the fuselage of said helicopter, and said antennas are located at the front, rear and top of said fuselage.

10. A gun aimpoint correction system, comprising:

a gun mounted in an aircraft;

a gun sight for sighting said gun at a target to be fired upon;

a munition projectile fired by said gun which upon impact radiates a burst of RF energy;

at least three antennas for receiving RF energy emitted by said projectile upon impact, said antennas mounted on spaced locations on said aircraft and separated from each other to form an antenna network;

time of arrival comparison circuit means for measuring the relative time of arrival of said RF energy emitted by said projectile at each said antenna;

means for providing an angle signal indicative of the angular position of said gun sight;

processing means responsive to said respective relative times of arrival and to said angular position signal for providing an angle error signal indicative of a correction to be made to the gun pointing direction; and gun servo means responsive to said correction signal for correcting pointing of said gun to improve the accuracy of subsequent projectiles fired by said gun at said target.

11. The system of claim 10 wherein said aircraft is a helicopter, said gun is mounted for forward firing, and said antennas are located at port and starboard sides of said helicopter, and adjacent the top of the fuselage of the helicopter.

12. A gun aimpoint correction system, comprising:

a gun sight for sighting said gun at a target to be fired upon;

a munition projectile fired by said gun which upon impact radiates a burst of RF energy;

at least three antennas for receiving RF energy emitted by said projectile upon impact, said antennas being separated from each other by respective separation distances to form an antenna network, and wherein the distances from said target to said antennas are much larger than said antenna separation distances such that an electromagnetic wave front resulting from said burst of RF energy is essentially flat over a space between said antennas;

time of arrival comparison circuit means for measuring the relative time of arrival of said RF energy emitted by said projectile at each said antenna;

means for providing an angle signal indicative of the angular position of said gun sight;

processing means responsive to said respective relative times of arrival and to said angular position signal for providing an angle error signal indicative of a correction to be made to the gun pointing direction, said processing means comprising means for directly computing the angle of arrival of said RF energy at said antenna network by use of a $\sin^{-1}$ function of a ratio of a difference in said relative times of arrival at respective antennas to a known propagation time for an RF signal to propagate between said antennas, and means for comparing said angle signal to said angle of arrival to determine said angle error signal; and gun servo means responsive to said correction signal for correcting pointing of said gun to improve the accuracy of subsequent projectiles fired by said gun at said target.

* * * * *